United States Patent [19]

Jackson et al.

[11] 4,418,124

[45] Nov. 29, 1983

[54] PLASMA SPRAY-CAST COMPONENTS

[75] Inventors: Melvin R. Jackson; John R. Rairden, III, both of Schenectady, N.Y.

[73] Assignee: General Electric Company, Cincinnati, Ohio

[21] Appl. No.: 292,857

[22] Filed: Aug. 14, 1981

Related U.S. Application Data

[63] Continuation of Ser. No. 194,084, Oct. 6, 1980.

[51] Int. Cl.$^3$ ............................................... B05D 1/10
[52] U.S. Cl. ..................................... 428/548; 428/546; 428/678; 75/950; 75/246; 415/212 R; 416/241 R
[58] Field of Search .......................... 427/34, 423, 427; 264/309; 428/937, 678; 75/950, 246; 244/133; 415/212 R, 212 A; 416/241 R

[56] References Cited

U.S. PATENT DOCUMENTS

| | | | |
|---|---|---|---|
| 2,679,669 | 6/1954 | Kempe | 415/212 R |
| 2,864,137 | 10/1952 | Brennan | 22/57.3 |
| 3,112,539 | 12/1963 | Barker | 427/34 |
| 3,486,833 | 12/1969 | Miller | 415/212 A |
| 3,689,987 | 9/1972 | Teague | 427/34 |
| 3,742,585 | 7/1973 | Wentzell | 29/423 |
| 3,758,233 | 9/1973 | Cross | 415/212 |
| 3,826,301 | 6/1974 | Brooks | 164/46 |
| 3,839,618 | 10/1974 | Muehlberger | 427/34 |
| 3,909,921 | 10/1975 | Brooks | 29/527.2 |
| 3,952,939 | 4/1976 | Schilling | 416/241 R |
| 3,982,854 | 9/1976 | Berry | 416/241 R |
| 4,066,117 | 3/1978 | Clark et al. | 164/46 |
| 4,137,619 | 2/1979 | Beltran | 416/241 R |
| 4,241,110 | 12/1980 | Veda | 416/241 R |
| 4,272,463 | 6/1981 | Clark et al. | 264/12 |
| 4,501,133 | 9/1977 | Cretella | 416/241 R |

FOREIGN PATENT DOCUMENTS

| | | | |
|---|---|---|---|
| 1299969 | 7/1969 | Fed. Rep. of Germany | 117/93.1 PF |
| 1379261 | 6/1972 | United Kingdom . | |
| 1472939 | 5/1977 | United Kingdom . | |
| 1529858 | 10/1978 | United Kingdom . | |
| 1565363 | 4/1980 | United Kingdom . | |
| 2032467 | 5/1980 | United Kingdom | 427/34 |
| 2061398 | 5/1981 | United Kingdom | 416/241 R |

OTHER PUBLICATIONS

*Metals Engineering Quarterly*, Feb. 1964, "Structure and Properties of Plasma-Cast Materials", Mash et al., pp. 18-26.

*Materials in Design Engineering*, Apr. 1959, "Cermets/- Two New Forms", Herz, pp. 98-99.

*Journal of Metals*, Jan. 1959, "30,000 Degrees with the Plasma Jet", pp. 40-42.

*Primary Examiner*—L. Dewayne Rutledge
*Assistant Examiner*—J. J. Zimmerman
*Attorney, Agent, or Firm*—Derek P. Lawrence; Stephen S. Strunck

[57] ABSTRACT

Gas turbine engine superalloy airfoils and other components made by low pressure/high velocity plasma spray-casting have unique microstructures and, consequently, novel combinations of physical properties superior to those of components of the same alloy compositions made by conventional methods.

22 Claims, 11 Drawing Figures

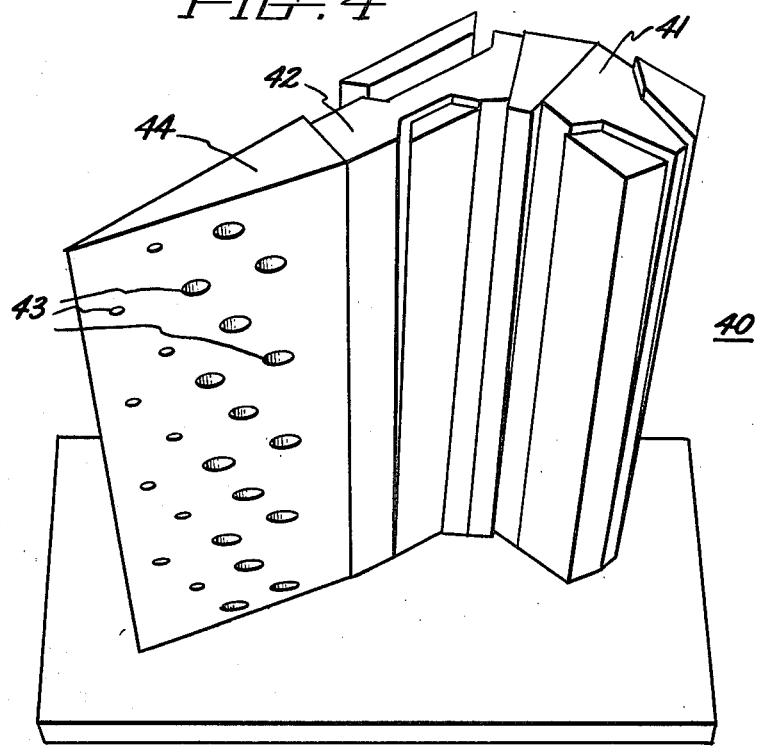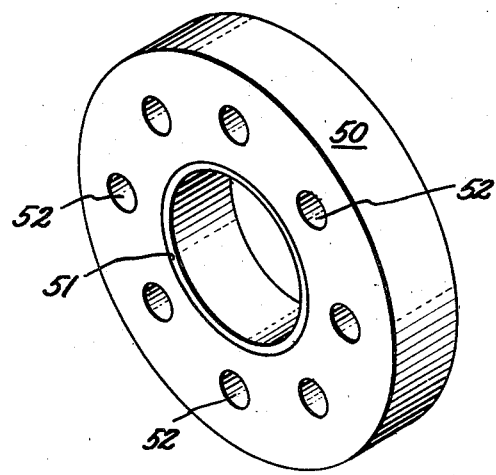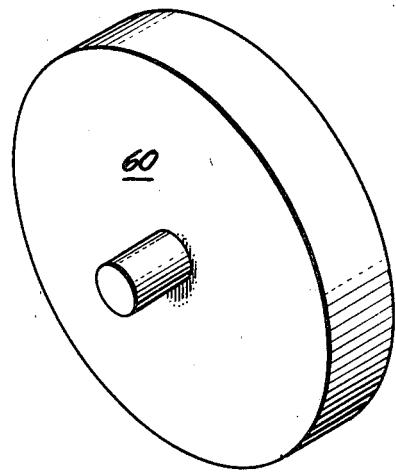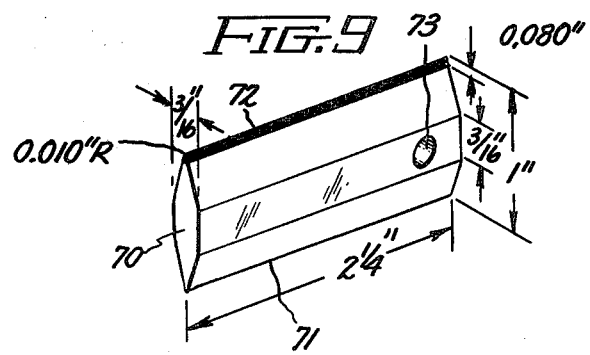

PLASMA SPRAY-CAST COMPONENTS

CROSS-REFERENCE

This application is a continuation-in-part of copending U.S. patent application Ser. No. 194,084, filed Oct. 6, 1980; the entirety of said copending application is hereby incorporated by reference. Application Ser. No. 463,207, filed Feb. 2, 1983, is a divisional application of this application.

Co-assigned U.S. patent applications Ser. Nos. 246,068 and 246,119, filed Mar. 20, 1981, may be material to the examination of the instant application.

BACKGROUND OF THE INVENTION

1. Field of the Invention

The present invention relates generally to the metal casting art and is more particularly concerned with novel components made by low pressure/high velocity plasma spray-casting which have unique microstructures and, consequently, novel combinations of physical properties superior to the physical properties of components of the same alloy compositions made by other methods. Articles of this invention having special utility because of the aforementioned superior physical properties, such as elevated temperature strength and ductility and thermal fatigue resistance, include, for example, gas turbine engine airfoils and discs made from nickel-base, cobalt-base or iron-base superalloys. Also included are articles, such as flywheels, which operate in lower temperature regimes than gas turbine engine parts, but present special physical property requirements problems and articles not readily obtainable by conventional methods due to their geometries or material compositions or combinations of the two.

2. Description of the Prior Art

Since the advent several decades ago of the gas turbine in various forms as a power generating and propulsion machine of major importance, there has been general recognition of the limitations imposed on the operation and performance of these machines by the available materials of construction. Relatively high tensile strengths and good ductility from room temperature to gas turbine combustion chamber operating temperatures, and good resistance to thermal fatigue, are highly desirable in combination in such applications. Extensive research and development efforts continuing to the present time have resulted in today's so-called "superalloys", prominent among which are the nickel-base, cobalt-base, iron-base and chromium-base refractory alloys including, for example, those marketed under the designation Rene' 80, Rene' 95, IN 738, IN 617 and IN 671.

Because of the importance of the strength requirements, especially in the lower temperature ranges of gas turbine operation, the first four of these alloys are used in airfoil and disc fabrication, whereas IN 671 is used primarily for its environmental resistance. Usually this use involves IN 671 in wrought sheet form, but it has been proposed as a plasma-sprayed coating applied directly on the article to be protected. The other four alloys are, however, generally melted and cast to shape and size or mechanically deformed from a cast or powder metallurgical body for ultimate use as airfoils and other gas turbine hot section components. Regardless of the fabrication method though, parts made of these alloys may require corrosion protection which presently takes the form in many cases of a spray-on coating of one of the MCrAlY alloys.

While, as indicated above, considerable advances in materials development have been made in answer to the special requirements of gas turbine engines, important materials capabilities are still lacking. To this time, however, superalloys used in fabricating gas turbine hot stage components have represented compromises between the above-mentioned various physical properties, operating conditions and manufacturing operations. This is particularly the case with those parts which are cast directly to shape. Thus, no new supperalloy which eliminates the necessity for such compromises in the production of cast components for gas turbine engines has materialized and no other alternative route to the elimination of those compromises has appeared prior to the present invention.

Another approach represented by the process of U.S. Pat. No. 4,066,117, issued Jan. 3, 1978, to Clark et al, entitled "Spray Casting of Gas Atomized Molten Metal to Produce High Density Ingots", involves as an essential step the mechanical deformation of the cast body as by forging to convert the superalloy ingot to an airfoil or other engine component form.

BRIEF DESCRIPTION OF THE INVENTION

We have discovered that the necessity for compromises between the materials for construction of gas turbine components and operating conditions, and for forging and similar processing operations, can be avoided so that the long-desired combination of properties can now be obtained in superalloy rotary machine cast components. Further, we have discovered that this result can consistently be achieved without making any change in superalloy composition or creating a new superalloy, and without incurring any significant production cost penalty.

These new results are the consequence of our surprising discovery that, in certain novel form, superalloys long used in cast form in gas turbine engine component production possess a virtually ideal combination of physical properties. In particular, we have found that in very fine and uniform microstructural form these superalloys possess physical properties quite different from and much superior to previously known forms of the same alloy compositions. This new form, which is not obtainable through conventional melting and casting procedures employed heretofore, is consistently producible by a plasma spray-casting process carried out in such a way as to form bodies of near theoretical density from fine superalloy particles near the melting temperature.

Processes of the prior art which cannot produce superalloy components having the unique combinations of physical properties of the present invention include, for example, the prior art plasma-arc spraying methods including that disclosed by Mash and Brown in a February 1964 article in Metals Engineering Quarterly entitled "Structure and Properties of Plasma-Cast Materials". The strength properties of the free-standing bodies fabricated by Mash and Brown were limited by the densities achieved (85 to 92%) and by their lamellar morphologies.

The procedure of our preference for the making of superalloy components having the unique properties of this invention is described in detail in U.S. Pat. No. 3,839,618, issued Oct. 1, 1974, to Muehlberger entitled "Method and Apparatus for Effecting High Energy Dynamic coating of Substrates" which is herein incorporated by reference. Actually, it was in the course of using the low pressure/high velocity process of that patent in the production of superalloy coatings that we made the key discovery underlying this invention. In examining and evaluating coatings produced through the use of nickel-base superalloys in this manner, we observed their unusual microstructure and the physical properties associated with the attributable to it. Applying that knowledge, we made test pieces by that plasma-spray method and confirmed in comparative tests with conventionally melted and cast test pieces our new concept that the superior physical properties of plasma-cast superalloy coatings can be readily obtained in bulk form, that is, in bodies consisting entirely of plasma-cast superalloy.

We have reason to believe, on the basis of the foregoing discoveries, that superalloys generally, as well as other refractory or heat resistant alloys and alloys having high tensile strength in temperature ranges well below maximum temperatures of gas turbine engine operation, can be plasma-cast this way to provide parts for gas turbines and other rotary equipment, such as flywheels, having high tensile loading and fatigue loading requirements. By way of example of typical operating conditions, gas turbine rotating discs are commonly subjected to tensile loading to up to 170 ksi at 1000° to 1200° F. and to fatigue loading to 120 ksi at 750° to 1200° F. Likewise, non-rotating vanes and nozzles in such engines are commonly subjected to creep loading at engine operating temperatures and also require thermal fatigue cracking resistance under conditions of temperature variations from ambient to engine operating temperatures.

In view of all the foregoing, and particularly the discoveries set forth above, this invention, briefly stated, is a plasma spray-cast article or component consisting of an alloy selected from the group consisting of nickel-base superalloy, cobalt-base superalloy, and iron-base superalloy which, in the as-plasma-spray-cast condition, typically contains less than about 1,000 parts per million oxygen, has a density greater than about 97% of theoretical, grain size from about 0.2 to about 0.5 micron and a chemically homogeneous microstructure substantially free from microsegregation.

In heat treated form, this article or component has density greater than about 98% of theoretical and even less microsegregation due to homogenization occurring during heat treatment. The grain size of the heat treated component will generally be larger than that of the as-plasma-spray-cast article and is a function of alloy type and the time and temperature of heat treatment; but, in superalloys strengthened by the precipitation of one or more phases, the as-heat-treated grain size may be in a range as low as from about 0.5 micron to about 5.0 microns.

This component or article, whether it is a flywheel, an airfoil for a gas turbine engine or a disc for attachment of the airfoil to the turbine wheel, or other hot section component, can be produced by the low pressure/high velocity plasma-casting method as a solid body or with a mandrel on which the superalloy is deposited and which is selectively dissolved and removed to leave a hollow cast product. Alternatively, a more complex mandrel may be used which, after dissolution, leaves a free-standing, self-supporting plasma spray-cast body having a plurality of hollow regions. Further, the mandrel may be segmented in such a manner that a first portion of the final body is plasma spray-cast of a first superalloy on part of the mandrel which is then assembled into the remaining portions of the mandrel and the body is completed by plasma spray-casting a second superalloy over the completed mandrel including the first portion.

BRIEF DESCRIPTION OF THE DRAWINGS

FIG. 4 is a perspective view of the copper mandrel assembly on which the airfoil of FIGS. 2 and 3 was plasma spray-cast.

FIG. 5 is a perspective schematic view of a simulated gas turbine disc produced by the low pressure/high velocity plasma spray-casting process.

FIG. 6 is a perspective view of a flywheel produced by the low pressure/high velocity plasma spray-casting process.

FIG. 9 is a schematic representation of the double wedge thermal fatigue specimen.

DETAILED DESCRIPTION OF THE INVENTION

Figure 1:
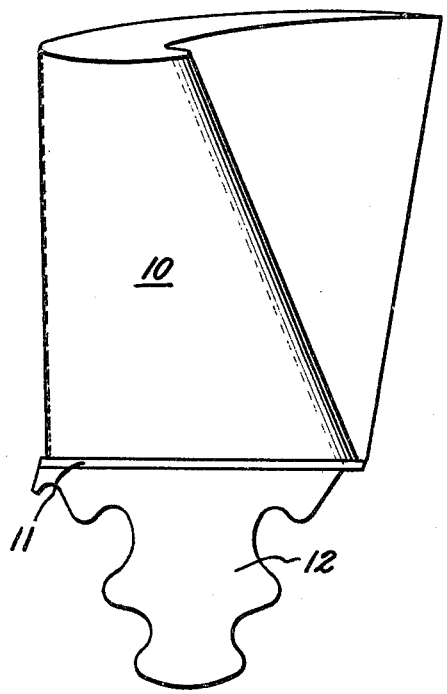
FIG. 1 is an elevational view of an airfoil which can be produced by low pressure/high velocity plasma spray-casting a nickel-base superalloy; the body being a solid structure consisting throughout of the nickel-base superalloy.

Gas turbine engine airfoil 10 of FIG. 1 is exemplary of the type of article of manufacture producible by plasma spray-casting. Airfoil 10 is of generally conventional size and shape and has platform 11 and a root portion 12 for secure attachment in the usual manner to a gas turbine disc such as simulated disc 50 of FIG. 5 and Example II, below. Both airfoil 10 and disc 50, however, differ significantly from prior art counterparts in respect to their physical properties and consequently their performance characteristics in normal engine operation even though they may be made of the same alloy composition as those same prior art components. This basic and important difference is a consequence of the different way in which these new parts may be made. Thus, instead of melting and casting in the customary manner or plasma-arc spray casting in the way described by Mash and Brown, cited above, airfoil 10 and disc 50 may be formed by delivering the superalloy at just above its melting point temperature in fine particle form at high velocity in a plasma stream onto a substrate in a neutral atmosphere low pressure chamber. In particular, in making an airfoil such as airfoil 10, and disc 50, the particle size is minus 400 mesh (i.e., substantially all particles are less than about 38 microns in diameter) and the chamber atmosphere is argon at 30 to 60 torr. As used herein, the term "gas turbine engine" is meant to encompass gas turbines used for electric power generation as well as jet engines used for aircraft propulsion.

Figure 2:
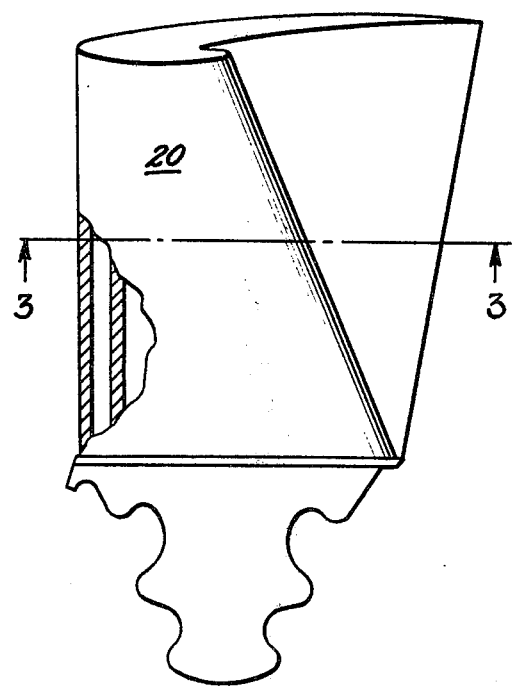
FIG. 2 is a partially sectioned view like that of FIG. 1 of another airfoil which is hollow having been produced on a copper mandrel assembly subsequently removed by selective chemical dissolution.
Figure 3:
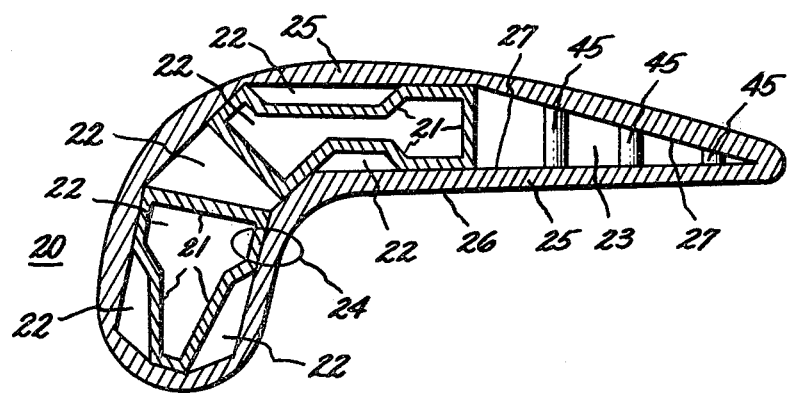
FIG. 3 is a transverse cross-sectional view of the airfoil of FIG. 2 cut along line 3—3 showing the internal passageways resulting from removal of the assembly of copper elements of the mandrel assembly on which the airfoil was formed by plasma spray-casting.

Hollow airfoil 20 of FIGS. 2 and 3 was produced in a similar manner as described above and in Example IV using low pressure/high velocity plasma spray-casting with generally the same microstructural and important novel physical property consequences described above in the summary. The significant structural difference between airfoils 10 and 20 consists in the use of selectively soluble mandrel assembly 40 of FIG. 4 which provides the interior spacings necessary to the production of walls 21 dividing the airfoil interior into separate chambers or passageways 22 and 23 for cooling fluid flow.

Flywheel 60 shown perspectively in FIG. 6, is made by the same low pressure/high velocity plasma spray-casting method described above and suitably any of the nickel-base, cobalt-base or iron-base superalloys can be used for this purpose which in such cast form are capable of meeting tensile loading and fatigue loading requirements for protracted service in such applications. As those skilled in the art will recognize, such cast flywheels can be made in sections suitably secured together or may be produced in the form of a single plasma spray-casting.

Those skilled in the art will gain a further and better understanding of this invention from the following examples of the practice of this invention as we have carried it out in tests designed to develop comparative data with respect to the important physical properties of the products of the invention and those of the melt and cast type of the prior art. These examples of this practice are consequently illustrative and not limiting in any respect upon the claims made for this invention as set out below.

The data collected in the course of the examples set forth below are stated in accordance with the usual practice. Thus, in Tables I, II and III, UTS designates ultimate tensile strength in thousands of pounds per square inch and YS designates the 0.2% offset yield strength in the same units. Likewise, $\varepsilon$ML designates elongation at maximum load, $\varepsilon$FAIL means elongation to failure, and R.A. means reduction in area; all three parameters being in percentage terms.

EXAMPLE I

A plate of IN 738 Ni-base superalloy approximately 2½ inches wide by 6 inches long by ¼ inch thick was formed by plasma spray-casting using the low pressure/high velocity method described above. The substrate was a steel plate that had been polished with 600 grit silicon carbide grinding paper. Bonding to the substrate (mandrel) and control of the IN 738 alloy density and microstructure were accomplished by preheating the substrate to about 1650° F. (900° C.). Deposition chamber pressure was 30 to 60 torr, plasma gun power was 68 kilowatts, and deposition time was 4 minutes and 30 seconds. The coated mandrel was cooled in the deposition chamber and then the IN 738 body was separated from the steel plate by tapping around the edge of the plate with a hammer. Specimens with overall dimensions of 0.063 inch thickness, 0.4 inch width and 1.0 inch length were machined from the IN 738 superalloy plate. The gauge section was 0.25 inch uniform by 0.08 inch in width. The test results obtained were as set out in Table I below together with data typical of conventionally melted and cast IN 738 alloy of the same specimen size and shape.

The conventionally melted and cast specimens received a heat treatment typical of that used commercially, i.e., heating at 2050° F. (1120° C.) for 2 hours followed by quenching in argon then heating at 1550° F. (845° C.) for two hours followed by quenching in argon, prior to testing. This is the condition in which parts made of IN 738 are typically used in today's gas turbines. The plasma spray-cast specimens were given a simulated commercial heat treatment which consisted of heating for 2 hours at 2100° F. (1150° C.).

Figure 7:
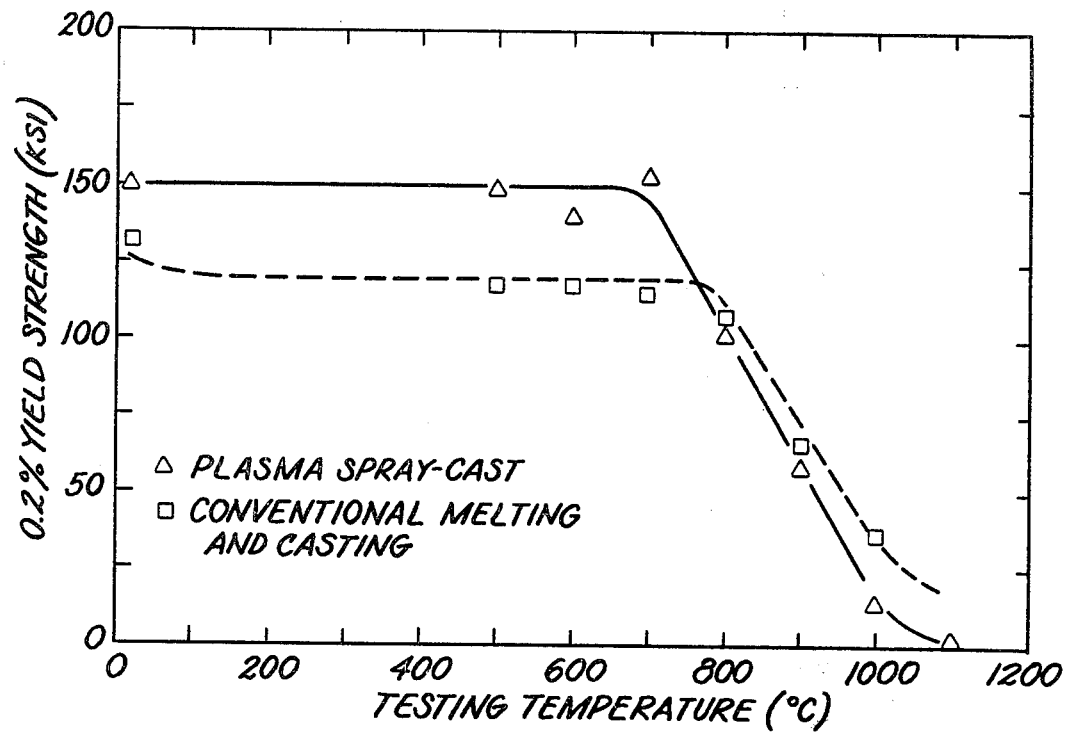
FIG. 7 is a graph of 0.2% offset yield strength versus testing temperature for the body of IN 738 alloy plasma spray-cast as described in Example I.
Figure 8:
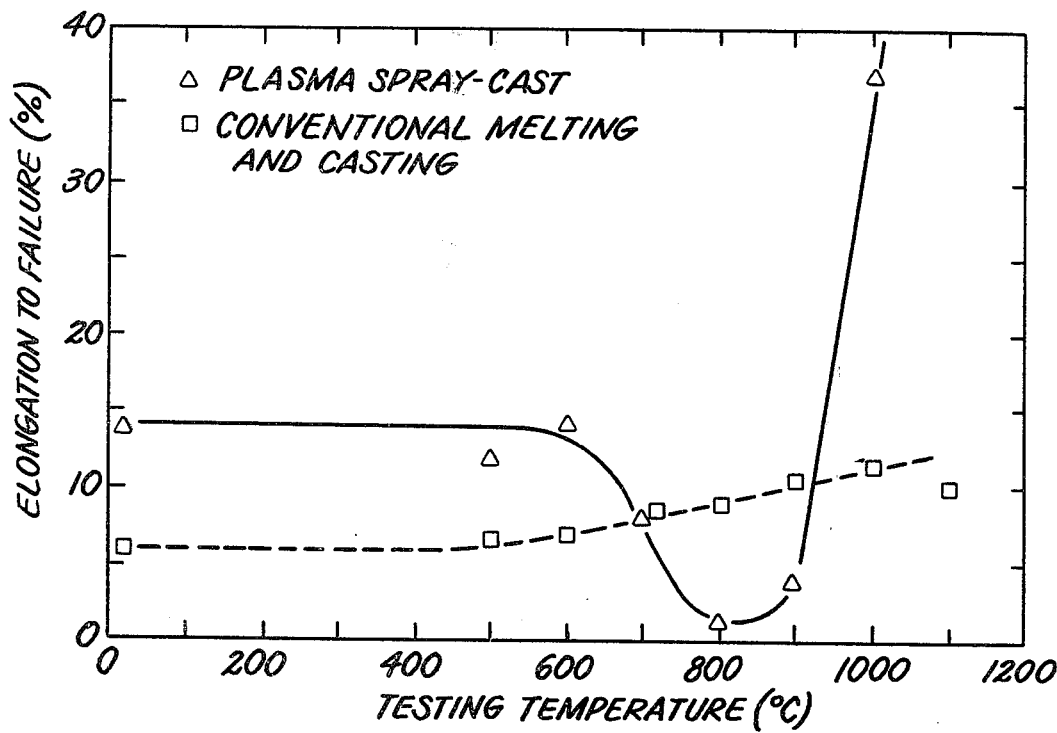
FIG. 8 is a graph of elongation to failure versus testing temperature for the body of IN 738 alloy plasma spray-cast as described in Example I.

The 0.2% offset yield strength and elongation to failure data of Table I are presented in graphical form in FIGS. 7 and 8, respectively. With reference to FIG. 7, it may be observed that the plasma spray-cast bodies are much stronger than conventionally melted and cast bodies of the same IN 738 superalloy composition, below about 1350° F. (735° C.), as measured by yield strength (FIG. 7). The ultimate tensile strength exhibits similar behavior. Between about 1450° F. (790° C.) and 1650° F. (900° C.), the yield strength of the plasma spray-cast bodies is only about 6 ksi lower than that of bodies processed using conventional melting and casting methods.

With reference to FIG. 8 it may additionally be noted that plasma spray-casting produces bodies which are more ductile than conventionally melted and cast bodies of the same composition up to about 1290° F. (700° C.). At about 2000° F. (1090° C.) the superalloy body of this example is fully superplastic, presumably due to the inherent ultra-fine grain size. Several specimens were heat treated at 2300° F. (1260° C.) to produce grain growth in an attempt to verify that the superplastic behavior was due to the ultra-fine grain size.

TABLE I

| TESTING TEMPERATURE | | PLASMA SPRAY-CAST IN 738 | | | MELTED AND CAST IN 738 | | |
|---|---|---|---|---|---|---|---|
| °F. | °C. | 0.2% YS (ksi) | UTS (ksi) | $\varepsilon$FAIL (%) | 0.2% YS (ksi) | UTS (ksi) | $\varepsilon$FAIL (%) |
| 68 | 20 | 150 | 205 | 14 | 131 | 156 | 6.1 |
| 932 | 500 | 149 | 200 | 12 | 118 | 142 | 6.6 |
| 1112 | 600 | 140 | 202 | 14 | 117 | 142 | 7.0 |
| 1292 | 700 | 154 | 180 | 8.2 | 115 | 142 | 7.6 |
| 1472 | 800 | 102 | 107 | 1.4 | 107 | 130 | 8.8 |
| 1652 | 900 | 59.1 | 63.3 | 3.9 | 65 | 88 | 10.5 |
| 1832 | 1000 | 14.6 | 22.0 | 37 | 36 | 47 | 11.4 |
| 2012 | 1100 | 2.6 | 4.1 | 300 | — | — | 10.0 |

Two of the heat treated specimens were tested; one at room temperature and one at 1832° F. (1000° C.). After heat treatment at 2300° F. (1260° C.), the elongation to failure decreased to 12% for the specimen treated at 1832° F. (1000° C.) thus confirming that the superplastic behavior was due to the inherent ultra-fine grain size in the plasma-cast body. Also, for the specimen heat treated at 2300° F. (1260° C.), the yield strength at room temperature increased by 26 ksi to a value of 176 ksi and by 10 ksi to a value of 24.8 ksi for the specimen tested at 1832° F. (1000° C.).

EXAMPLE II

Simulated gas turbine engine disc 50 of FIG. 5 was made of Rene' 80 by plasma spray-casting using the low pressure/high velocity method described above. The substrate 51 was a 4.2 cm diameter steel tube and the superalloy was built up on it to form a structure having an annular cross section transverse to its length or axial dimension. The build-up was varied along the length of the disc thus forming a member having a parabolic cross-section in the axial or lengthwise direction. The nominal diameter of the disc was approximately 10 cm.

As in Example I, the substrate was prepared by surface cleaning, grit blasting and preheating to about 1650° F. (900° C.). Throughout the operation, as in Example I, deposition chamber pressure was 30 to 60 torr (argon) and plasma gun power was 68 kilowatts. After cooling in the deposition chamber, the Rene' 80 toroid body was removed from steel tube 51 and after machining to the form shown in FIG. 5, slugs were cut from disc 50 as indicated by the several holes 52 in the body, to provide mechanical test bars. These test specimens of standard form and size were heat treated for two hours at 1145° C., then for two hours at 870° C. and then tested in the usual manner with the results set out in Table II. Also shown in Table II, is comparative data for melted and cast Rene' 80 following a typical commercial 5 step heat treatment procedure.

As may be observed from Table II, the physical properties of the plasma spray-cast body of Rene' 80 are superior to those of the conventional melted and cast Rene' 80 in a manner similar to that observed for IN 738 in Example I.

EXAMPLE III

In another experiment designed to measure the thermal fatigue behavior of the products of this invention, Rene' 80 nickel-base alloy was plasma spray-cast on a Rene' 80 substrate body. A melt of nominal Rene' 80 composition was chill cast in copper plate molds to provide two plates ¼ by 1½ inch by 4 inches. One edge surface ¼ inch by 4 inches of each plate was grit blasted and degreased. Then a plasma spray-cast structure was built up on the prepared edge using the low pressure/high velocity method of Example I, the powder used being minus 400 mesh of the nominal Rene' 80 composition. The resulting deposit was about 0.150 inch thick. Double wedge thermal fatigue specimens 70 were machined from the plates so that one wedge 71 was in the cast structure and the other wedge 72 was in the plasma spray-cast structure for the final 0.08 inch as shown in FIG. 9. Specimens 70 were tested by exposure alternatively by hanging from hole 73 for 4 minutes in a fluidized bed held at 1787° F. (975° C.) and for 2 minutes in a bed at 75° F. (24° C.).

Inspection of specimens 70 was made after 10, 30, 100, 300, 600 and 1,000 cycles of this sort. No cracks were observed in plasma spray-cast wedge 72 after 1,000 cycles, while cracks were observed in conventionally cast wedge 71 after 10 cycles. Cracks had grown to more than 0.04 inch in length after 30 cycles for the cast wedge 71 and to as much as 0.225 inch after 1,000 cycles.

EXAMPLE IV

An airfoil like that of FIGS. 2 and 3, except that it was without root portion 12, was made by the plasma spray-casting method described above through the use of the copper mandrel assembly 40 of FIG. 4. The deposition chamber conditions were those of Example I. In the first stage of the process, IN 738 was plasma spray-cast on copper mandrel segments 41 and 42 to a thickness of about 15 mils. Mandrel segments 41 and 42 were then assembled with the balance of the mandrel segments to form the configuration 40 shown in FIG. 4. Holes 43 in mandrel segments 44 were filled with wires of a Nichrome composition.

In the second stage of the process, 15 to 30 mils of Rene' 80 were plasma spray-cast on the copper mandrel assembly 40 of FIG. 4 and the previously plasma spray-cast IN 738 walls 21 to form a composite layer-like structure in regions such as region 24. After cooling in the deposition chamber, the airfoil assembly was immersed in aqueous nitric acid to dissolve and remove the copper mandrel components, leaving cast airfoil 20 which measured about two inches in height (as viewed in FIG. 2) and about 1.5 inches from leading edge to trailing edge. With reference to FIG. 3, it may be noted that interior wall segments 21 are of the IN 738 superalloy and are structurally joined into airfoil 20 by Rene' 80 outer shell 25. The outer peripheral surface 26 of Rene' 80 shell 25 defines the shape of airfoil 20. Inner peripheral surface 27 encloses passageways 22 and 23 and mates and structurally joins, at least along a portion of its periphery, walls 21 of the plasma spray-cast IN 738. The wires which were previously positioned in holes 43 are now integral members 45 of the airfoil and function to agitate the cooling medium as it flows in the hollow interior 23 of the trailing section of airfoil 20. The wall thickness of airfoil 20 ranges from about 15 to about 30 mils of Rene' 80 and to upwards of about 45 mils of which 15 mils is IN 738 superalloy.

EXAMPLE V

A thin wall pipe-like member or casing was made of Rene' 80 using the plasma spray-casting method and parameters of Example I above. The Rene' 80 superalloy was plasma-spray cast to a thickness of 20 mils on a steel pipe having an inside diameter of 4 inches and a length of 12 inches.

The thin walled pipe-like member of this example could not have been made by conventional casting techniques about a central core without a high likelihood of producing a severely cracked product. Other conventional techniques, such as casting an oversize thick-

TABLE II

| TESTING TEMPERATURE | | PLASMA SPRAY-CAST RENE' 80 | | | | | MELTED AND CAST RENE' 80 | | | |
|---|---|---|---|---|---|---|---|---|---|---|
| °F. | °C. | 0.2% YS (ksi) | UTS (ksi) | $E_{ML}$ (%) | $E_{FAIL}$ (%) | R.A. (%) | 0.2% YS (ksi) | UTS (ksi) | $E_{FAIL}$ (%) | R.A. (%) |
| 68 | 20 | 177 | 236 | 12 | 12 | 15 | 124 | 149 | 5.2 | 7 |
| 1112 | 600 | 155 | 204 | 13 | 15 | 17 | 105 | 149 | 7.5 | 11 |
| 1382 | 750 | 143 | 148 | 1 | 8 | 12 | 104 | 146 | 9 | 12 |
| 1650 | 900 | 41.2 | 49.7 | 2 | 16 | 18 | 66 | 91 | 13 | 26 | walled member and machining to size, are costly. In any event, however, no conventional technique can produce the thin-walled casing of this example with its attendant unique properties including, for example, grain size on the order of about 0.2 micron to about 0.5 micron with a chemically homogeneous microstructure substantially free of microsegregation.

EXAMPLE VI

The process of Example I was repeated by plasma spray-casting a plate-like body of a cobalt-base superalloy (Co-29Cr-6Al-1Y) normally used as a coating for gas turbine airfoils made from nickel-base superalloys. The grain size of the as-plasma-spray-cast cobalt-base body, as measured by transmission electron microscopy, ranged from about 0.1 to about 0.3 micron.

EXAMPLE VII

The process of Example I was again repeated by plasma spray-casting a plate-like body of an iron-base superalloy (19.5Cr-9.5Al-bal Fe). The grain size of the as-plasma-spray-cast iron-base body, as measured by transmission electron microscopy, ranged from about 0.15 to about 0.25 micron. The mechanical properties at room temperature, 1110° F. (600° C.), and 1380° F. (750° C.) are presented in Table III below and compared with commercial melted and cast iron-base superalloy MA956 (20Cr-4.5Al-0.5Ti-0.5Y-bal Fe). Although the plasma spray-cast superalloy has lower strength values than the conventional alloy, it compares favorably to MA956 and the ranking of the two is not unexpected since the MA956 superalloy has the added strengthening elements titanium and yttrium.

TABLE III

| TESTING TEMPERATURE | | PLASMA SPRAY CAST FE-BASE ALLOY | | | | | MELTED AND CAST MA956 | |
| --- | --- | --- | --- | --- | --- | --- | --- | --- |
| °F. | °C. | 0.2% YS (ksi) | UTS (ksi) | $E_{ML}$ (%) | $E_{FAIL}$ (%) | R.A. (%) | UTS (ksi) | ELONGATION (%) |
| 68 | 20 | 61 | 75 | 12 | 14 | 16 | 104 | 13 |
| 110 | 600 | 25 | 29 | 5 | 23 | 22 | — | — |
| 1380 | 750 | 11 | 13 | 3 | 21 | 15 | — | — |
| 1600 | 870 | — | — | — | — | — | 18 | 8 |

The plasma spray-cast bodies of Examples I through IV and VI and VII all revealed essentially the same microstructural characteristics, i.e., in the as-plasma-spray-cast condition the grain size typically ranged from about 0.2 to about 0.5 micron and the structures were chemically homogeneous and substantially free from microsegregation. Although not examined, the microstructure of the Rene' 80 thin-walled casing of Example V is expected to be the same as the microstructures of the other Examples.

Figure 10:
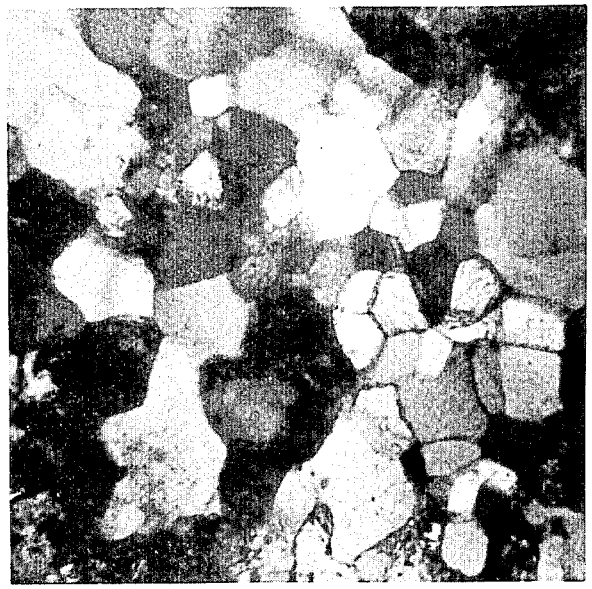
FIG. 10 is a transmission electron micrograph at 40,000X of a thin foil specimen of as-plasma-spray-cast Rene' 80.

The microstructure of the Rene' 80 of FIG. 10, plasma spray-cast as a plate-like body in accordance with the method and procedures of Example I, is typical of the microstructure of superalloys in the as-plasma-spray-cast condition. FIG. 10, which is a transmission electron micrograph of a thin foil specimen at 40,000X, reveals the ultra-fine grain size which ranges from about 0.2 to about 0.5 micron. FIG. 10 also shows the the grain boundaries as well as the grain interiors are substantially free of precipitates and segregates, i.e., are chemically homogeneous and substantially free from microsegregation. An unmelted particle, due to perturbations in the spraying equipment or the powder, may occasionally be observed in the microstructure of the as-plasma-spray-cast superalloy bodies of this invention. The features of these particles do not survive after heat treatment, e.g., two hours at 2100° F. (1150° C.). It is necessary to use electron microscropy rather than conventional light microscopy to examine the as-plasma-spray-cast bodies due to the extremely fine grain size which is below the limits of resolution of light microscopy.

A characterization of the chemical homogeneity and absence of microsegregation of the as-plasma-spray-cast Rene' 80 of FIG. 10 is provided by the electron microprobe X-ray fluoroescence data of Table IV below. In Table IV, plasma spray-cast Rene' 80 is compared to conventionally melted and cast Rene' 80 which had an average grain size of about 60 mils (1525 microns). The data of Table IV was obtained by step-scanning a 1-3 micron diameter beam across the samples in 50 micron steps for the conventionally melted and cast sample and in 1 micron steps for the plasma spray-cast sample. In both cases, the beam interrogated both grains and grain boundaries and that was necessarily so for the plasma spray-cast sample since the beam diameter was about 4 times the grain diameter.

Cobalt is an element which is essentially non-segregating in nickel, therefore, the variation in cobalt concentration can be used as an indication of the degree of scatter in the data. For the plasma spray-cast specimen, the variation, i.e., microsegregation or chemical inhomogeneity, in Ti, Al, and Cr is about 2 to 3% above normal scatter. For conventionally melted and cast Rene' 80, the variation in Cr and Al is about 11% above normal scatter while the variation in Ti is about 70% above normal scatter. Therefore, by the data of Table IV, there is virtually no microsegregation or chemical inhomogeneity in the as-plasma-spray-cast material relative to conventionally melted and cast material.

Figure 11:
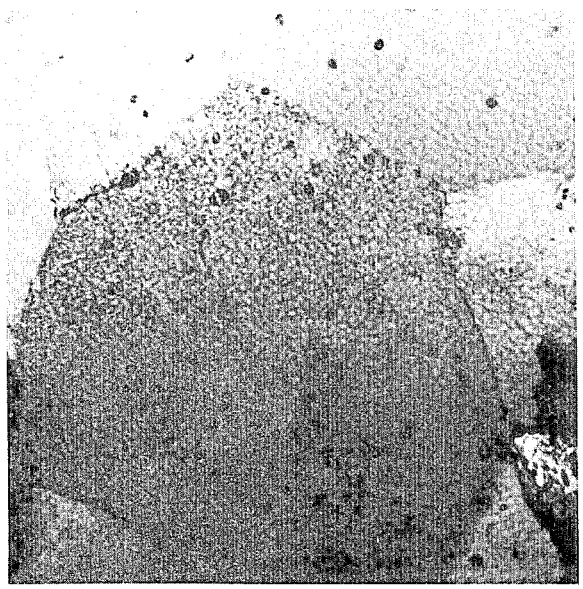
FIG. 11 is a transmission electron micrograph at 20,000X of a thin foil specimen of plasma spray-cast Rene' 80 following heat treatment for 2 hours at 2190° F. (1200° C.).

FIG. 11 is a transmission electron micrograph at 20,000X of a thin foil specimen which shows the microstructure of as-plasma-spray-cast Rene' 80, as in FIG. 10, following a 2 hour heat treatment at 2190° F. (1200° C.) The grains have grown to an average size of about 5 microns, yet remain small in comparison to that of conventionally melted and cast Rene' 80. Gamma-prime precipitates are visible in the interior of the grains. Heat treatment at lower temperatures, e.g., the two hour heat treatments at 2100° F. (1150° C.) referred to above in Example I, resulted in even less grain growth, i.e., the grain size was on the order of from about 2.0 to about 3.0 microns and theoretically there is even less microsegregation due to the homogenization effects of the elevated temperature heat treatment. The stability of Rene' 80 to grain growth at elevated temperatures was anticipated since this superalloy is strengthened by the precipitation of the gamma prime phase.

TABLE IV

| ELEMENT | CONVENTIONALLY MELTED AND CAST RENE' 80 | | | | PLASMA SPRAY-CAST RENE' 80 | | | |
|---|---|---|---|---|---|---|---|---|
|  | Ti | Al | Cr | Co | Ti | Al | Cr | Co |
| RANGE (wt. %) | 3.51–9.33 | 2.26–3.26 | 9.73–14.65 | 8.32–9.92 | 4.83–5.73 | 2.48–2.81 | 11.42–12.85 | 7.74–8.42 |
| AVG. (wt. %) | 5.1 | 2.7 | 12.37 | 9.13 | 5.31 | 2.62 | 11.86 | 8.11 |
| RANGE ABOUT AVG. (%) | ±80 | ±20 | ±20 | ±9 | ±8 | ±7 | ±8 | ±5 |

In comparison is the behavior of the non-gamma-prime-strenghtened nickel-base alloy IN 617. When plasma spray-cast in accordance with the method of Example I, IN 617 exhibited the same ultra-fine grain size (0.2 to 0.5 micron in diameter) of the bodies of other superalloys formed by plasma spray-casting. The room temperature tensile properties of the plasma spray-cast IN 617 were considerably better, e.g., UTS of 142 versus 111 ksi and $^E$FAIL of 54 versus 34%, than those of conventionally melted and cast IN 617. However, as-conventionally-cast and as-plasma-spray-cast specimens of IN 617 exhibited nearly identical tensile properties when tested at 1650° F. (900° C.) This nearly identical behavior is attributed to grain growth occurring during the testing. Heat treatment at 2280° F. (1250° C.) caused the grains of the plasma spray-cast IN 617 to grow considerably and following heat treatment the tensile properties of the plasma spray-cast IN 617 were about the same as those of the conventional melted and cast IN 617 both when tested at room temperature and at 1650° F. (900° C.).

Before heat treatment, the plasma spray-cast bodies of this invention were all of about the same high density of from about 97% to nearly 100% of that theoretically possible. Prior art spray cast bodies characteristically have gaps, pores, or voids between individual spray cast particles either uniformly or randomly or both throughout the bodies. These gaps or voids, when present, prevent the bodies from being fully or 100% dense.

After heat treatment, e.g., the two hour heat treatments at 2100° F. (1150° C.) of Example I, the plasma spray-cast bodies of this invention were more dense by up to one percent or more with the minimum density being greater than about 98% of theoretical. Heat treatment did not alter the oxygen content of these test specimens, but at a level of less than about 100 parts per million, oxygen is not a significant factor in the strength properties of the plasma-cast articles of this invention although it may affect the ductility properties.

Still further, as is evident from the mechanical properties of plasma spray-cast bodies of this invention, rotary machine plasma spray-cast components of this invention are capable of long service as both rotor and stator parts of gas turbine engines, including airfoils which are commonly subject to pitchline (centerline) stresses of approximately 25 ksi at 1500° to 1800° F., particularly in aircraft engines. In fact, superalloy blades, vanes and nozzles or transition pieces and discs of this invention can be expected on the basis of our experience and the data set forth above to have much longer service life in gas turbine engines than their counterparts made in accordance with prior art teachings and practices.

From all the foregoing, it is apparent, also, that mechanical deformation of the plasma spray-cast articles of this invention is not necessary in producing components such as gas turbine engine components; hollow airfoils like that of FIGS. 2 and 3, for instance, being castable with outer and inner wall sections as thin as desired and with the superior microstructural and physical properties typical of the products of this invention as set forth above. Thus, this invention is specially useful in application to relatively small and thin-section parts, but is applicable also to substantial advantage to larger, heavier section pieces because it eliminates the necessity for mechanical deformtion, such as forging, of castings.

In this application, grain size is that measured from transmission electron micrographs, such as those of FIGS. 10 and 11, using the method known as the lineal intercept method wherein the grain size is then reported in terms of grain "diameter" even though the grains typically have the equiaxed appearance of those in FIGS. 10 and 11 when viewed parallel to the plane of deposition.

We claim:

1. An article of manufacture formed by the low pressure/high velocity plasma spray-casting of a superalloy selected from the group consisting of nickel-base superalloy, cobalt-base superalloy and iron-base superalloy, said article in the as-plasma-spray-cast condition having a density greater than about 97% of theoretical, the superalloy of said article having in the as-plasma-spray-cast condition a grain size in the range of from about 0.2 micron to about 0.5 micron, less than about 1,000 parts per million oxygen and a chemically homogeneous microstructure substantially free from microsegregation.

2. A heat treated article of manufacture formed by the low pressure/high velocity plasma spray-casting of a superalloy selected from the group consisting of nickel-base superalloy, cobalt-base superalloy and iron-base superalloy, said article having a density greater than about 98% of theoretical, the heat treated superalloy of said article having a grain size in the range of from about 0.5 micron to about 5.0 micron, less than about 1,000 parts per million oxygen and a chemically homogeneous microstructure substantially free from microsegregation.

3. A rotary machine component formed by the low pressure/high velocity plasma spray-casting of a superalloy selected from the group consisting of nickel-base superalloy, cobalt-base superalloy and iron-base superalloy, said component in the as-plasma-spray-cast condition having a density greater than about 97% of theoretical, the superalloy of said component having in the as-plasma-spray-cast condition a grain size in the range of from about 0.2 micron to about 0.5 micron, less than about 1,000 parts per million oxygen and a chemically homogeneous microstructure substantially free from microsegregation.

4. The rotary machine component of claim 3 which is a gas turbine rotor component.

5. The rotary machine component of claim 3 which is a gas turbine stator component.

6. The rotary machine component of claim 4 which is an airfoil consisting of nickel-base superalloy.

7. The stator component of claim 5 which is a vane.

8. The airfoil of claim 6 which is a hollow structure having at least one passageway therethrough for coolant flow during use.

9. The rotary machine component of claim 4 which is a gas turbine engine disc.

10. The rotary machine component of claim 3 which is a flywheel.

11. A heat treated rotary machine component formed by the low pressure/high velocity plasma spray-casting of a superalloy selected from the group consisting of nickel-base superalloy, cobalt-base superalloy and iron-base superalloy, said component having a density greater than about 98% of theoretical, the heat treated superalloy of said component having a grain size in the range of from about 0.5 micron to about 5.0 microns, less than about 1,000 parts per million oxygen and a chemically homogeneous microstructure substantially free from microsegregation.

12. The rotary machine component of claim 11 which is a gas turbine rotor component.

13. The rotary machine component of claim 11 which is a gas turbine stator component.

14. The rotary machine component of claim 12 which is an airfoil consisting of nickel-base superalloy.

15. The rotary machine component of claim 13 which is a vane.

16. The airfoil of claim 14 which is a hollow structure having at least one passageway therethrough for coolant flow during use.

17. The rotary machine component of claim 12 which is a gas turbine engine disc.

18. The rotary machine component of claim 11 which is a flywheel.

19. A composite article of manufacture of a first and at least a second superalloy selected from the group consisting of nickel-base superalloy, cobalt-base superalloy, and iron-base superalloy, said composite article comprising a first low pressure/high velocity plasma spray-cast deposit of a first superalloy and at least a second low pressure/high velocity plasma spray-cast layer of a second superalloy overlying and structurally joined to at least a portion of said first deposit, the superalloys in said composite having compositions different from each other, said composite article in the as-plasma-spray-cast condition having a density greater than about 97% of theoretical, the superalloys of said composite article having in the as-plasma-spray-cast condition a grain size in the range of from about 0.2 micron to about 0.5 micron, less than about 1,000 parts per million oxygen and a chemically homogeneous microstructure substantially free from microsegregation.

20. The plasma spray-cast composite article of claim 19 in the form of an airfoil having a plurality of hollow passageways, said first deposit of a first superalloy shaped to define at least one of said hollow passageways, said second-deposited layer of a second superalloy enclosing said passageways and having inner and outer peripheral surfaces, said outer peripheral surface defining the shape of said airfoil with at least a portion of said inner peripheral surface overlying and being structurally joined to at least a portion of said first deposit of said first superalloy.

21. A heat treated composite article of manufacture of a first and at least a second superalloy selected from the group consisting of nickel-base superalloy, cobalt-base superalloy, and iron-base superalloy, said composite article comprising a first low pressure/high velocity plasma spray-cast deposit of a first superalloy and at least a second low pressure/high velocity plasma spray-cast layer of a second superalloy overlying and structurally joined to at least a portion of said first deposit, the superalloys in said composite having compositions different from each other, said heat treated composite articles having a density greater than about 98% of theoretical, the superalloys of said heat treated composite articles having a grain size in the range of from about 0.5 micron to about 5.0 microns, less than about 1,000 parts per million oxygen and a chemically homogeneous microstructure substantially free from microsegregation.

22. The plasma spray-cast composite article of claim 21 in the form of an airfoil having a plurality of hollow passageways, said first deposit of a first superalloy shaped to define at least one of said hollow passageways, said second-deposited layer of a second superalloy enclosing said passageways and having inner and outer peripheral surfaces, said outer peripheral surface defining the shape of said airfoil with at least a portion of said inner peripheral surface overlying and being structurally joined to at least a portion of said first deposit of said first superally.

* * * * *